UNITED STATES PATENT OFFICE.

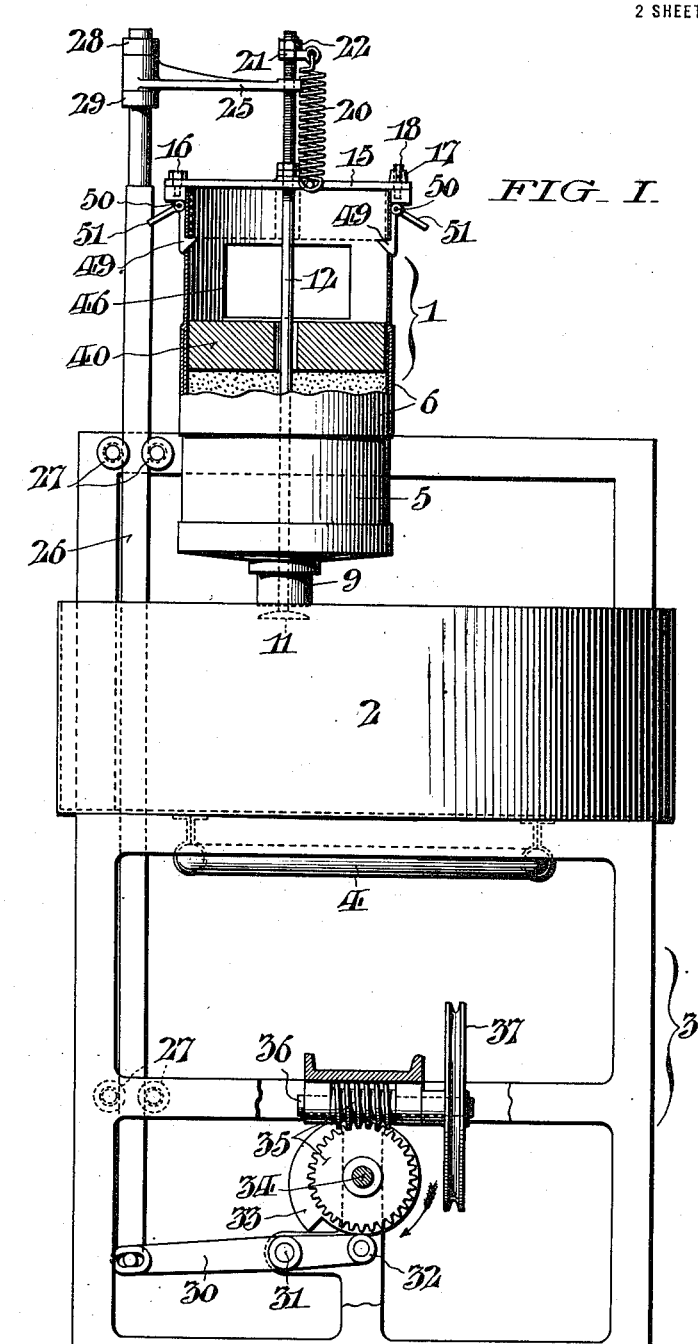

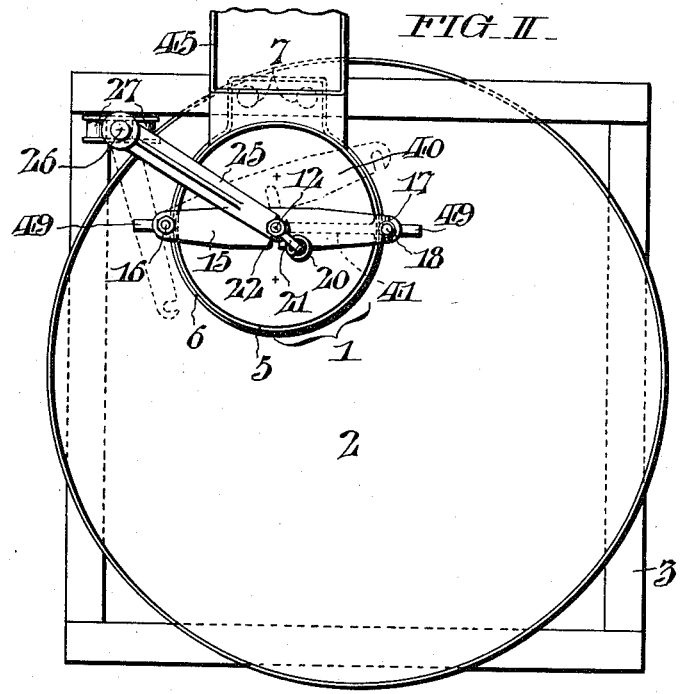
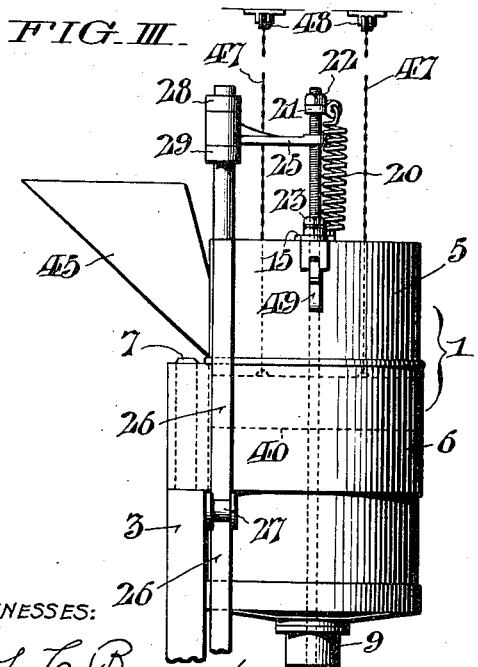
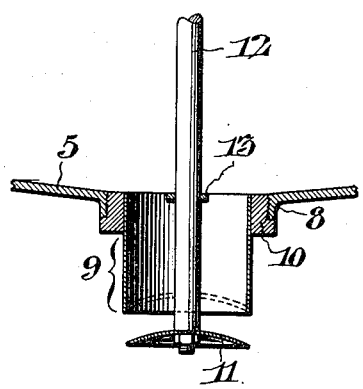

FRANK E. MORRIS, OF PHILADELPHIA, PENNSYLVANIA.

DEVICE FOR FORMING PASTRIES AND THE LIKE.

1,416,735.  Specification of Letters Patent.  Patented May 23, 1922.

Application filed April 2, 1920. Serial No. 370,638.

*To all whom it may concern:*

Be it known that I, FRANK E. MORRIS, a citizen of the United States, residing in Philadelphia, in the county of Philadelphia and State of Pennsylvania, have invented certain new and useful Improvements in Devices for Forming Pastries and the like, whereof the following is a specification, reference being had to the accompanying drawings.

The invention relates to devices for forming pastries such, for example as doughnuts or crullers, and its primary object is to provide an organization whereby such pastries may be automatically formed in a rapid and continuous manner, and which may be used separately, or in conjunction with apparatus by which the formations are subsequently cooked.

The requisites of a device of the above character is that it shall be extremely durable, simple in operation, cheap of manufacture, and of such construction as to be capable of being readily taken apart for cleaning.

These advantages I attain in a comparatively simple embodiment such as set forth in the detailed description which follows.

Referring to the drawings, Fig. I, is, for the most part, a front elevation of a pastry forming device shown in association with a cooking apparatus, portions of the forming device being represented in section so as to more clearly illustrate certain important details.

Fig. II, is a plan view of the structure.

Fig. III, is an elevation of the forming device as viewed from the left of Fig. I; and Fig. IV, is a detail view, on an enlarged scale, of the forming die outlet of the storage receptacle for the dough.

Referring first to Figs. I and II, it will be noted that the forming device represented comprehensively at 1, is mounted so as to overhang a pan or trough 2, adapted to contain a suitable cooking liquor, said pan being supported upon a stand or frame 3. The apparatus may be supplemented with a gas burner such as represented conventionally at 4, for heating the cooking liquor. The rear portion of the frame extends somewhat above the top of the pan 2, in order to serve as a support for the forming device, as best seen in Figs. II and III. The forming device comprises a storage receptacle 5, for the dough, which receptacle is preferably cylindrical in form, and is surrounded about midway of its height by an embracing band 6, having an apertured rearward extension adapted to be slipped over upstanding posts 7, on the frame 3. This construction affords a simple mounting for the forming device, so that the latter may be readily removed for cleaning after prolonged operation. The receptacle 5, has at its bottom a co-axial threaded opening 8, (see Fig. IV.) into which is screwed a die outlet 9. This outlet is formed preferably of a short piece of thin tubular stock, to one end of which is attached a threaded annulus 10. By this provision for removal, die outlets of different diameters may be readily interchanged in accordance with the requirements of the device in practice. Co-operating with the lower edge of the die outlet 9, is a cutter disk 11, the normal position of which is illustrated in the drawings. This disk is secured to the lower end of an actuating rod 12, extending co-axially through the receptacle, and projecting well above the same as clearly shown in Figs. II and III. Near its lower end, said rod is guided in a cross piece 13, forming a part of the die outlet structure, and its upper end is guided by a bridging plate 15, spanning the top of the receptacle 5. Said bridging plate is pivoted about a stud bolt 16, at one side of the receptacle, and detachably secured at the other by means of a winged nut 17, having threaded engagement with a fixed stud 18. In order that the bridging piece 15, may be swung clear of the rod 12, to permit disassembling, it is provided, both at the region of engagement with said rod and the stud 18, with arcuate notches as clearly shown in Fig. II. The cutter disk 11, is held in or urged to the normal open position shown through the instrumentality of a coiled tension spring 20, anchored at one end to a pin projection on the bridging plate 15, and secured at the other to an eyelet extending laterally from a collar 21. Said collar is engaged upon the threaded upper end of the rod 12, and has associated with it, a jamb nut 22. The latter two elements may be shifted along the rod for a purpose which will be presently explained. The limit of the downward movement of the disk 11, is determined by stop nuts 23, also engaged upon the threaded portion of the rod 12, and adapted to normally rest upon the bridging piece 15.

Intermittent actuation of the rod 12, is effected by means of an arm 25, which is attached to the upper end of a slide bar actuator 26, supported for vertical motion between paired rollers 27, 27, on the frame 3. The outer end of the arm 25, loosely embraces the rod 12, so as to permit free relative movement.

The size of the annular formations extruded through the die outlet depends upon the size of the discharge opening, (i. e., the interval between the cutter disk 11, and the lower edge of the die outlet 9, and the time period between successive operations of the cutter disk.) Variations in the size of the die outlet may be produced by shifting the stop nuts 23, along the rod 12. In order that clean severance may be effected, it is essential that the cutter disk, in its upward movement, be lifted to a level slightly above the lower edge of the die outlet. Compensatory adjustment to bring this about (in consideration of the regulation of the outlet adjustment) may be made by shifting collar 21, and the associated jamb nut 22, on the extreme upper end of the rod so that more or less, as the case may be, of the reciprocatory movement of the arm 25, can be utilized in effecting the desired results.

The time intervals between successive actuations of the cutter disk are determined by the frequency of the reciprocations of the bar 26, and an attendant dwell in each of such reciprocatory movements. For the purposes of illustration herein, I have shown such actuation as effected by a mechanism which may be briefly described as follows:

Referring to Fig. I, it will be seen that the lower end of the bar 26, is connected through a pin and slot arrangement with one extremity of a rocking lever 30, which is fulcrumed intermediate its ends about a fixed stud 31, upon the frame 3. Upon its opposite extremity the lever carries a roller 32, adapted to co-operate with a cam 33, on a continuously rotating shaft 34. This shaft is driven by a worm gear couple 35, from a shaft 36, which may be in turn driven from a suitable source of power by means of an attached pulley 37. It will be particularly noted that the rise in the cam 33, is comparatively short in extent so as to provide a considerable concentric portion whereby the desired dwell above referred to may be obtained, and also that an abrupt drop is provided to effect a quick opening of the die outlet after severance of each formation, and the disk 11 is, as a result, jarred when the stop 23 comes in contact with the bar 25 at the end of the downward movement of the disk, so as to insure clean, quick doffing of the formations.

From Fig. III, it will be observed that the arm 25, is supported upon the upper rounded end of the bar 26, between two collars 28 and 29, and that its outer end is notched so that the said arm may be swung away from engagement with the rod when desired.

For the purpose of imparting the necessary pressure to the dough to effect extrusion through the die outlet, I have provided a weight 40, which has the same configuration as the receptacle 6, so as to be guided by its walls and to exert upon the dough, under actuation by gravity, sufficient pressure to extrude a formation from the die outlet 9 at each opening of the disk 11. The weight 40, is formed with a radial slot 41, so that it may be readily slipped from about the rod when the device is taken apart for cleaning. The receptacle 6, is charged from time to time from a supply hopper 45, which is offset with respect to said receptacle, and communicates therewith through an opening 46. (Fig. I.) In order that the weight may be lifted above the level of the opening 46, to permit recharging of the receptacle, I have attached the same to the lower ends of chains 47, which run over pulleys 48, and may be actuated in any approved manner. During the raising of the weight, the latter engages the inclined cam surfaces upon the lower ends of hook members 49, which are freely pivoted about pins 50, and which operate through suitable openings in a side wall of the receptacle. By this engagement, these hooks are automatically swung outwardly until the weight has been lifted above the plane of the horizontal ledges of the hooks whereupon the latter automatically return to engage beneath the weight, and thus support it until the charging of the receptacle has been accomplished. As soon as the receptacle has been refilled, these hooks may be manually withdrawn to release the weight to activity, fingers 51 having been provided on said hooks for this purpose.

Having thus described my invention, I claim:

1. A device of the character described, comprising a cylindrical storage receptacle for the dough having in axial continuation, at its bottom, a die outlet; a cutter disk co-operating with the edge of the die outlet; an actuating rod to which the cutter disk is attached extending axially through the die outlet and the receptacle; means for intermittently actuating the rod to close the die outlet and cause severance of formations extruded therethrough; and a weight in said receptacle about said rod actuated by gravity to exert upon the dough pressure sufficient to extrude a formation from the die outlet at each opening thereof by said disk.

2. In a machine for producing annular pastry formations, the combination of a storage receptacle for dough having at its bottom a die outlet; a cutter disk movable downward and upward out of and into said die outlet, so as, on the one hand, to afford an annular opening for extrusion of the material, and, on the other hand, to shear off the extruded material by entry within said die outlet; an actuating rod for said disk extending upward therefrom through said receptacle; and a weight in said receptacle about said rod actuated by gravity to exert upon the dough pressure sufficient to extrude a formation from the die outlet at each opening thereof by said disk.

3. In a machine for producing annular pastry formations, the combination of a storage receptacle for dough having at its bottom a die outlet; a cutter disk movable downward and upward out of and into said die outlet, so as, on the one hand, to afford an annular opening for extrusion of the material, and, on the other hand, to shear off the extruded material by entry within said die outlet; a spring urging said cutter disk to open position; means for periodically raising said cutter disk permitting a quick drop thereof, under impulsion of the spring, after severance of each formation; and a weight in said receptacle actuated by gravity to exert upon the dough pressure sufficient to extrude a formation from the die outlet at each opening thereof by said disk.

4. In a machine for producing annular pastry formations, the combination of a storage receptacle for dough having at its bottom a die outlet; a cutter disk movable downward and upward with reference to said die outlet so as, on the one hand, to afford an annular opening for extrusion of the material, and, on the other hand, to sever the extruded material; means for guiding said disk, and means for limiting its opening movement adjustable to vary the opening afforded for extrusion; means for periodically raising said cutter disk through a lost motion connection; and a weight in said receptacle actuated by gravity to exert upon the dough pressure sufficient to extrude a formation from the die outlet at each opening thereof by said disk.

5. A device of the character described, comprising a storage receptacle for the dough having at its bottom a periodically open die outlet; an offset supply hopper communicating with the interior of the receptacle through a charging opening near the top of the latter; a weight guided within the receptacle actuated by gravity to exert upon the dough pressure sufficient to extrude a formation through the die outlet at each opening thereof; and means for temporarily sustaining the weight in inactivity at a level above said charging opening to permit filling of the receptacle, said means including freely suspended latch hooks adapted to swing automatically beneath the weight when the latter is raised to inactivity.

6. In a machine for producing annular pastry formations, the combination of a storage receptacle for dough having at its bottom a die outlet; a cutter disk movable downward and upward with reference to said die outlet so as, on the one hand, to afford an annular opening for extrusion of the material, and, on the other hand, to sever the extruded material; a weight in said receptacle actuated by gravity to exert upon the dough pressure sufficient to extrude a formation through the die outlet; an actuating rod for said disk extending upward therefrom through said weight above the top of the receptacle; a vertically movable actuator adjacent the receptacle; and an arm carried by said actuator whereby said rod is periodically raised through a lost motion connection.

In testimony whereof, I have hereunto signed my name at Philadelphia, Pennsylvania, this 31st day of March, 1920.

FRANK E. MORRIS.

Witnesses:
JAMES H. BELL,
E. L. FULLERTON.